(12) United States Patent
Fitch et al.

(10) Patent No.: US 6,761,958 B2
(45) Date of Patent: Jul. 13, 2004

(54) EMBOSSABLE THERMOPLASTIC POLYESTER FILM AND METHOD FOR PRODUCING THE FILM

(75) Inventors: John Fitch, Warwick, RI (US); Jan Moritz, Bristol, RI (US); Gianfranco Chicarella, Jr., Providence, RI (US); Yuji Shimizu, Saunderstown, RI (US); Yasuo Nishigaki, Saunderstown, RI (US); Bonnie Adams, Charlestown, RI (US); Michael G. Fatica, Warwick, RI (US); Steven J. Sargeant, Kingston, RI (US)

(73) Assignee: Toray Plastics (America), Inc., Rhode Island ( * ) Notice: Subject to any disclaimer, the term of this patent is extended or adjusted under 35 U.S.C. 154(b) by 0 days.

(21) Appl. No.: 10/206,453

(22) Filed: Jul. 26, 2002

(65) Prior Publication Data

US 2003/0108756 A1 Jun. 12, 2003

Related U.S. Application Data

(63) Continuation-in-part of application No. 10/087,689, filed on Mar. 1, 2002.
(60) Provisional application No. 60/348,422, filed on Oct. 24, 2001, and provisional application No. 60/317,765, filed on Sep. 6, 2001.

(51) Int. Cl.$^7$ .................. B32B 27/08; B32B 27/20; B32B 27/30; B32B 27/36; B32B 31/14
(52) U.S. Cl. ............. 428/141; 428/156; 428/167; 428/172; 428/480; 428/483; 428/910; 428/213; 428/215; 428/216; 428/337; 428/339; 264/288.4; 264/289.3; 264/290.2
(58) Field of Search .................. 428/156, 167, 428/172, 486, 483, 910, 212, 213, 214, 215, 216; 427/299, 322, 331, 384, 385.5, 393.5; 264/288.4, 289.3, 290.2

(56) References Cited

U.S. PATENT DOCUMENTS

| 3,758,649 A | 9/1973 | Frattarola |
| 3,871,947 A | 3/1975 | Brekken |
| 3,922,416 A | 11/1975 | Ryan |
| 3,979,540 A | 9/1976 | Moffett |
| 4,208,468 A | 6/1980 | Cunningham et al. |
| 4,333,981 A | 6/1982 | Winfield |
| 4,364,885 A | * 12/1982 | Kanai et al. ............. 264/134 |
| 4,443,397 A | 4/1984 | Hahn et al. |

(List continued on next page.)

FOREIGN PATENT DOCUMENTS

| EP | 1 213 319 A2 | 6/2002 |
| GB | 1 078 813 A | 8/1967 |
| KR | 2001-053913 | * 7/2001 |

OTHER PUBLICATIONS

Schimtz, Peter et al., "Films." Ullmann's Encyclopedia of Industrial Chemistry, 5th Ed., vol. A11 (1988), pp. 85–95, 108–110.*

Bryson, Trudy, *Creating Interference Colors on Thermoplastic Films Without Colorants*, Coburn Corporation, Oct. 6, 1982.

Mann, S.F., *Holographic Advances Open New Dimensions for Converters*, Dennison Mfg. Co., Jul. 1986.

*Optical Embossing*, James River Products, Jun. 14, 2001.

*Primary Examiner*—Vivian Chen
(74) *Attorney, Agent, or Firm*—Piper Rudnick LLP

(57) ABSTRACT

A directly embossable, coated polyethyleneterephthalate film including a dry, uniaxially oriented PET film, and a coating applied to the PET film, wherein the coating and the PET film have as a composite been transversely stretched, the coating resin being capable of impregnating the PET surface on drawing, rendering the film surface susceptible to embossing under pressure and the coating having low heat sealability and a method of producing a coated, directly embossable polyethyleneterephthalate film.

14 Claims, 1 Drawing Sheet

U.S. PATENT DOCUMENTS

| | | |
|---|---|---|
| 4,585,687 A | 4/1986 | Posey et al. |
| 4,734,335 A | 3/1988 | Monzer |
| 4,797,317 A * | 1/1989 | Oliver et al. ............... 428/204 |
| 4,913,858 A | 4/1990 | Miekka et al. |
| 5,100,709 A | 3/1992 | Barger et al. |
| 5,155,604 A | 10/1992 | Miekka et al. |
| 5,164,227 A | 11/1992 | Miekka et al. |
| 5,248,470 A | 9/1993 | Bollinger et al. |
| 5,464,690 A | 11/1995 | Boswell |
| 5,532,066 A | 7/1996 | Latiolais et al. |
| 5,643,678 A | 7/1997 | Boswell |
| 5,670,240 A | 9/1997 | Davis |
| 5,674,580 A | 10/1997 | Boswell |
| 5,756,183 A | 5/1998 | Kutsch et al. |
| 5,756,188 A | 5/1998 | Reiter et al. |
| 5,759,683 A | 6/1998 | Boswell |
| 5,800,911 A | 9/1998 | Sankey et al. |
| 5,824,394 A | 10/1998 | Kinoshita et al. |
| 5,894,048 A | 4/1999 | Eckart et al. |
| 5,904,976 A | 5/1999 | Berry et al. |
| 5,932,150 A | 8/1999 | Lacey |
| 5,955,181 A | 9/1999 | Peiffer et al. |
| 6,111,696 A | 8/2000 | Allen et al. |
| 6,238,782 B1 | 5/2001 | Hellmann et al. |
| 6,254,712 B1 | 7/2001 | Enlow et al. |
| 6,344,310 B1 | 2/2002 | Bourdelais et al. |
| 6,355,404 B1 | 3/2002 | Camp et al. |
| 6,420,019 B1 | 7/2002 | Peiffer et al. |
| 6,436,219 B1 | 8/2002 | Francis et al. |
| 6,440,530 B1 | 8/2002 | Jud |
| 2001/0022982 A1 | 9/2001 | Neavin et al. |
| 2002/0015836 A1 | 2/2002 | Jonza et al. |
| 2002/0061394 A1 | 5/2002 | Fujita |
| 2002/0064650 A1 | 5/2002 | Masuda |
| 2002/0110692 A1 | 8/2002 | Suzuki et al. |
| 2003/0077467 A1 * | 4/2003 | Fitch et al. ................. 428/480 |

* cited by examiner

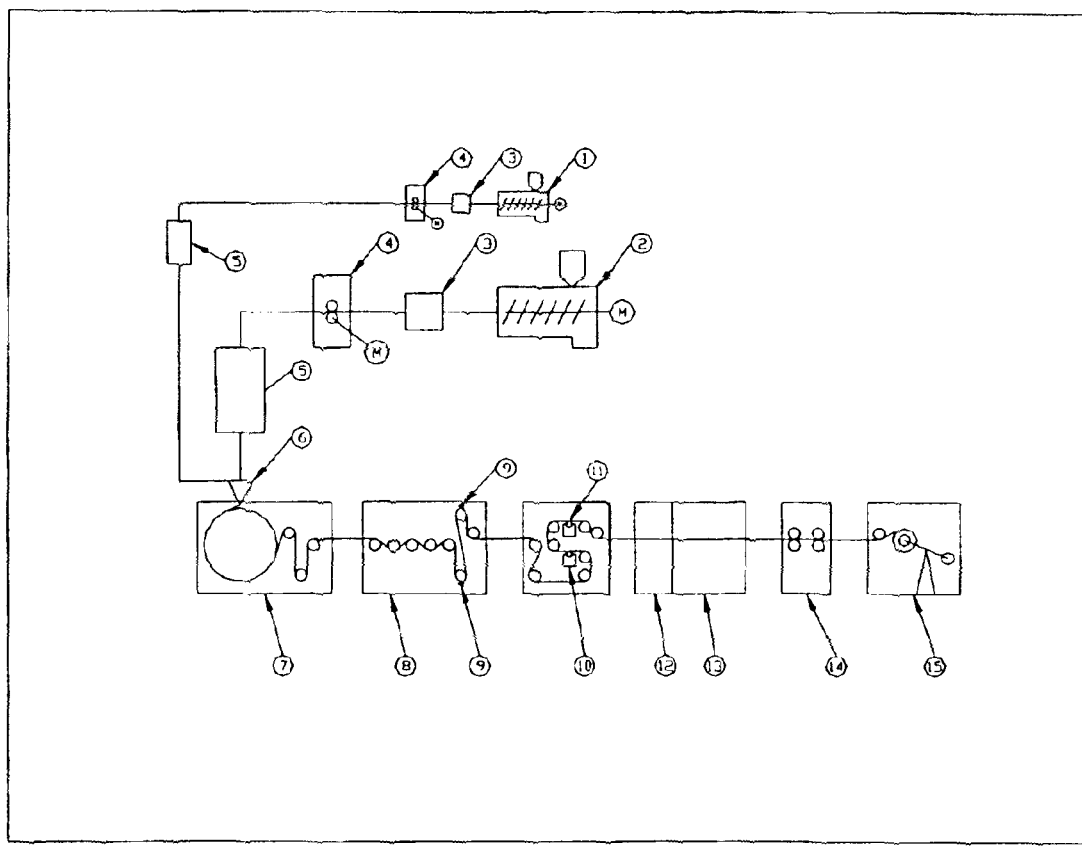

EMBOSSABLE THERMOPLASTIC POLYESTER FILM AND METHOD FOR PRODUCING THE FILM

RELATED APPLICATIONS

This is a continuation-in-part of U.S. patent application Ser. No. 10/087,689, filed Mar. 1, 2002, which claims the benefit of U.S. Provisional Application No. 60/348,422, filed Oct. 24, 2001 and U.S. Provisional Application No. 60/317,765 filed Sep. 6, 2001.

FIELD OF THE INVENTION

This invention relates to a coated film with exceptional embossing characteristics and a method for producing the film.

BACKGROUND

Holograms and diffraction gratings are images that diffract light created by the texturizing of a substrate under heat and pressure. Such images are used to create decorative packaging, security products and a host of other uses. The embossed substrates are often metallized to create high contrast. Such metallized substrates are found on credit cards, membership materials, board laminates, labels, toys, packaging materials and many commodity products.

Currently, it is well known in the art to produce holograms by embossing polyvinylchloride (PVC), polyethyleneterephthalate (PET), biaxially oriented polypropylene (BOPP), polystyrene (PS), polyamides (PA) such as Nylon or other plastic materials. If the substrates are BOPP or PET it is also well known in the art to produce holographic substrates by coating a relatively thick acrylic layer on the substrate by a coating process. In the case of PET substrates, this coating is done by an off-line process as is done by hologram manufactures at the point of use of the web substrate. However, it is desirable to get a pre-coated and embossable PET film from a substrate manufacturer that can directly accept the holographic texture. Such a material would obviate the need for the hologram manufacturers to coat the base materials and will reduce overall costs of manufacturing.

Unfortunately, in order to produce a directly embossed film at the point of film manufacture, it is deemed necessary to provide a thick, embossable, surface on the PET film. Such a surface can be provided either through a co-extrusion process or, perhaps, through an inline coating process. In the case of co-extrusion, it is necessary to produce a surface layer with many of the same characteristics of PET. Therefore, IV, melt strength, melt viscosity and the like are important parameters necessary to get the co-extruded layer through the PET film making process. Typical materials that can survive this process are often analogs of PET itself. These materials suffer the problem of having low crystallinity and are, therefore, heat-sealable. A heat-sealable material will often stick to the embossing shim rendering the embossed texture of little commercial quality.

In the case of inline coating of PET film, the thickness deemed necessary to produce embossable holographic substrates are practically impossible to achieve with a film making process. A thick-coated layer will require reduced PET film making line speeds to accommodate the high water loads in a tenter oven. In addition, the presence of a thick coating on the PET film will often make recycling of coated PET film waste back into the process difficult, or in many cases impossible.

DESCRIPTION OF THE PRIOR ART

U.S. Pat. No. 4,913,858 describes the requirements of an offline coating for holographic embossing use.

U.S. Pat. No. 3,758,649 describes embossing directly into a thermoplastic sheet.

Other known publications include:

Creating Interference Colors on Thermoplastic Films Without Colorants, Trudy Bryson, Coburn Corporation, 1982

Dimension, design and printability, James Coburn

Holographic Advances Open New Dimensions For Converters, S. F. Mann, Dennison Mfg. Co. 1986

Optical Embossing, James River Products.

SUMMARY OF THE INVENTION

This invention relates to an embossable, coated polyethyleneterephthalate (PET) film including a uniaxially oriented PET base film, and a coating applied to the PET base film, wherein the coating and the PET base film have as a composite been transversely stretched, the coating resin impregnating a surface portion of the PET base film upon the transverse stretching, thereby rendering the surface portion of the film susceptible to embossing.

This invention also relates to a method of producing a coated, directly embossable polyethyleneterephthalate (PET) film including stretching a PET film to form a uniaxially oriented PET film, drying the uniaxially oriented PET film, coating at least one surface of the uniaxially oriented PET film with an aqueous solution of an organic material, and rendering at least one surface of a resulting coated uniaxially oriented PET film susceptible to direct embossing by impregnation of the surface of the uniaxially oriented PET film with at least a portion of the coating by transverse stretching the coated uniaxially oriented PET film to produce a biaxially oriented and embossable polyester film.

BRIEF DESCRIPTION OF THE DRAWING

The drawing schematically shows one example of apparatus suitable for use in producing films in accordance with aspects of the invention.

DETAILED DESCRIPTION

We discovered a method to render the PET embossable via the incorporation of a unique surface coating. This coating can be applied to PET film during the film making process and renders the PET film, itself, embossable by impregnating the PET and softening the upper layer of the film structure. The composite structure is then embossable without the need for a secondary coating step. Furthermore, this material maintains its embossability without acting as an easy heat-sealable material. Such properties are advantageous for low cost production of holographic images.

We also discovered that embossability of an inline coated polyester film is enhanced by utilizing a smooth surface material and/or optionally a co-extruded co-polyester surface layer as the coating surface. Such a base sheet polyester can be prepared with equipment and materials well known in the art. Through the combination of a co-extruded film structure and utilizing the inline embossable film coating, an embossable thermoplastic sheet has been discovered with enhanced image properties, namely reduced granularity or graininess of the embossed image.

Turning now to the Drawing, a preferred method for producing a film in accordance with aspects of the invention will be described.

The polyester base sheet can be prepared via the utilization of a co-extrusion, casting and sequential stretching apparatus. An extruder 2 can be used to produce the bulk of the polyester sheet, sometimes referred to as the core layer. Onto the surface of the core layer another layer may be deposited through the use of a secondary extruder 1. These extruders preferably feed a melt pump system 3 and 4 to keep the output of the layers constant and not substantially influenced by viscosity changes of the molten polymer. Also, preferably, before laminating the melt streams, the molten polymer is filtered through fritted filter steel 5. Each molten polymer stream is separated through this part of the process.

After filtering, the molten polymer streams are laminated together to form a continuous stream of molten polymer in a feedblock assembly and die 6. The, now, two layer molten polymer is quenched onto a cooled rotating steel drum 7, often referred to as a casting drum or cooling drum to produce a solid amorphous sheet. This sheet is then oriented in the forward, or machine direction, through a set of heated rollers or stenter 8. After stretching in the forward direction, the film surface can, if desired, be treated on either or both surfaces via the use of corona treaters 9. In the case of inline coating the film, the PET film is preferable treated to enhance adhesion of coatings to the PET substrate(s) comprising the PET film.

Many methods to surface coat the uniaxially oriented polyester film exist. Such methods such as roll coating, gravure coating, air knife-coating and rod coating, among others are well known to those skilled in the art. Preferable methods include gravure and rod coating. In the case of rod coating, thickness variations of the coating are readily achieved through simple and low cost change out of the coating rods. Furthermore, if two side coating of the film is desired, for instance to produce a one side embossable and one side print adhesion coated polyester film, a two side rod coater is preferred due to the relative simplicity of operation. As shown in the drawing, either the non-drum surface can be coated at station 10 or the drum side surface can be coated at coater station 11 depending on the orientation of the co-extruded surface on the casting drum 7.

After coating the co-extruded film in coater station 11, the film is dried in the stenter before stretching in section 12. The previously uniaxially oriented and coated film is drawn in the side ways, or transverse or cross machine direction in section 13 to produce a biaxially oriented, coated film. The film is then inspected for defects at station 14 after biaxially orientation and wound into large spools or rolls at 15.

As set forth above, during the film making process, a uniaxially oriented PET film can be coated. This coating is then dried and stretched in the transverse direction. We determined that certain coatings impregnate the upper surface of the polyester film during the transverse stretching operation. This renders the upper polyester surface modified. We determined certain coatings that render the upper surface of the polyester film pliable, but not heat sealable, such that this modification to the polyester film renders the composite film structure capable of being embossed under heat and pressure. This makes the composite PET film processable for holographic film use without the need for a secondary coating step.

Furthermore, we discovered that the pliability of the upper surface of the PET film can be modified to further increase the image appearance of a hologram. Co-extrusion of a co-polyester or smooth surface material results in an increase to the overall quality of the hologram. Accordingly, it is advantageous to use a PET base film that is co-extruded and forms at least two layers. Also, the PET base film can advantageously contain particles such as those selected from the group consisting of silica, alumina, calcium carbonate and mixtures thereof, as well as others. Such particles are preferably present in the amount of about 0.005 wt % to about 0.6 wt %, based on the weight of the PET film.

The PET film preferably has a thickness of about 4.5 $\mu$m to about 60 $\mu$m.

The PET base film is preferably stretched in an amount of about 3.4 to about 5.4 times and the coated PET film, as a composite, is preferably stretched in an amount of about of 3.3 to about 4.6 times in the transverse direction.

As noted above, the coating material is most preferably selected from the group consisting of non-crosslinked polystyrene-acrylic emulsions and a non-crosslinked polyester dispersion, although other coatings may be used. The coating most preferably has a thickness of about 0.1 $\mu$m to about 0.4 $\mu$m.

The co-extruded layers preferably comprise a polyester layer and a co-polyester layer. The co-polyester layer may be formed from isophthalic acid or a derivative of cyclohexane dimethanol, as well as other components. The co-polyester layer preferably has a thickness between about 0.1 $\mu$m and 3.0 $\mu$m. Also, the co-polyester layer preferably has a surface which contacts the coating and has a roughness Ra of less than about 40 nm.

The embossing evaluation of the coated films were done as follows:

A 12 ton Carver hydraulic hot press model #3912 with 6×6 inch heated platens was used to evaluate the embossing capabilities of the coated film material. A 4×4 inch nickel embossing shim was placed on top of a 4×4 inch sample. Both platens were heated to 220 F. The film sample and shim were pressed together for 10 seconds at 400 psi. The sample was removed and placed on a bench top to cool. The film was then slowly peeled off the shim at a 45 degree angle. The sample was then placed on a black background to enhance the visibility of the embossed image and rated as follows:

Excellent=Bright colors viewed from many angles with no unembossed areas.
Good=Colors not as robust from different angles.
Fair=Colors not as bright.
Poor=Colors dull with unembossed areas.

The invention will be further described hereinafter with reference to examples which are intended as being illustrative of the invention and in no way are to be construed as limiting in any way.

EXAMPLES

Smooth Base Film Preparation For Examples 1–3

A polyester base film was prepared as follows:

Polyethylene terephthalate was polymerized by a known method: A melt slurry of ethylene gylcol and purified terephthalic acid was heated, in the presence of a esterification catalyst, and water and excess ethylene glycol were removed under vacuum leaving a residual melt of polyester. This melt was discharged via strand die into a cooling trough, pelletized, and then further dried to remove residual moisture to less than 50 ppm. Trimethylphosphate of 0.032 wt %, magnesium acetate of 0.060 wt %, antimony trioxide of 0.026 wt %, and Tetraethyl ammonium hydroxide of 0.252 wt %, were also used to prepare polyester A. External particles were not added to polyester A.

Polyethylene terephthalate was polymerized by a known method: A melt slurry of ethylenegylcol and purified terephthalic acid was heated, in the presence of a esterification catalyst, and water and excess ethylene glycol were removed under vacuum leaving a residual melt of polyester. This melt was discharged via strand die into a cooling trough, pelletized, and then further dried to remove residual moisture to less than 50 ppm. Lithium acetate dihydrate of 0.226%, Trimethylphosphate of 0.181 wt %, phosphorous acid of 0.020 wt %, antimony trioxide of 0.04 wt %, and calcium acetate of 0.119 wt %, were used to prepare a polyester B.

Particles (A) being $SiO_2$ particles of an average particle size 2.6 um, were admixed into polyethylene terephthalate polymerized by a known method: A melt slurry of ethylenegylcol and purified terephthalic acid was heated, in the presence of a esterification catalyst, and water and excess ethylene glycol were removed under vacuum leaving a residual melt of polyester. This melt was discharged via strand die into a cooling trough, pelletized, and then further dried to remove residual moisture to less than 50 ppm. Tetraethyl ammonium hydroxide of 0.049 wt %, Lithium acetate dihydrate of 0.882 wt %, antimony trioxide of 0.039 wt %, and calcium acetate of 0.090 wt %, and trimethylphosphate of 0.042 wt % were also used to prepare polyester C. The content of particles (A) in the polyester pellet (C) was 2.0%.

Next, 48.5 parts by weight of pellets (A), 48.5 parts by weight of pellets (B), and 3.0 parts by weight of pellets (C), were mixed. The mixed pellets were extruded using a vent type two-screw extruder to produce melt stream (I). Next, 48.5 parts by weight of pellets (A), 48.5 parts by weight of pellets (B), and 3.0 parts by weight of pellets (C), were mixed. Up to 55% recycle consisting of finished film can replace equal parts of polymer A and polymer B. The mixed pellets were dried under vacuum at 150° C. for 3 hours and extruded to produce melt stream (II). Melt stream (I) was fed through a rectangular joining zone where it was laminated to a melt stream of polyester (II). The laminate produced a three layer co-extruded I/II/I structure where polymer (I) and polymer (II) were essentially the same. The extruded polymer was delivered through a die in the form of a molten curtain. The resulting melt curtain was quenched on a casting drum, and then biaxially oriented via subsequent stretching steps on a roller train and chain driven transverse stretcher as is well known in the art.

The total thickness of the film is not particularly important. Typical end use conditions range from about 4.5 um to about 60 um, but is most typically typically about 12 um for this application.

During the film making process, the uniaxially oriented co-extruded PET film can be coated. This coating is then dried and stretched in the transverse direction. Such a process is well known in the art. We discovered the advantageous use of use of smooth and/or amorphous base film coupled with an embossable surface coating to render a brightly embossed PET film material.

Description of Graininess

Judging the quality of embossing is subjective, depending on the visual acuity of the observer and the observation angle, as well as the mood of the observer. A method was devised that can be used to judge the quality of embossing by the gloss level to better quantify graininess and, hence, the embossing quality.

Equipment

BYK Chemie glossmeter

Film holder

Procedure a rainbow shim pattern (a standard well-known embossing pattern in the industry) was used to emboss an image into a sample.

the sample was aluminum metalized in a bell jar metallizer, or if the sample was made at wide web, in a roll to roll metalizer.

the embossed and metallized sample was pulled taut in a film holder.

an 85° angle of illumination was used.

3 readings were taken in the films transverse direction and averaged.

The gloss readings were then compared with a subjective visual rating of the embossing.

EXAMPLES

Example 1

| Coating solution #1 | |
| --- | --- |
| Styrene acrylic emulsion (1) | 49.0 Parts |
| Acetylenic Surfactant (2) | 0.01 parts |
| Propylene glycol phenyl ether (3) | 1.2 Parts |
| Deionized Water | 49.0 Parts |

Setalux 37–3372 sold by Akzo Nobel

Surfynol 440 sold by Air Products

Dowanol PPH, Dow Chemical Inc.

Coating solution #1 was coated onto uniaxially oriented PET utilizing a #4 wire wound bar. This coating was dried and then the PET film drawn in the transverse direction to a stretching ratio of about 3.8 to produce a composite PET film with a surface coating thickness of about 0.4 um. Very good embossing was received under the test conditions.

Example 2

The base film as described above was coated with the following surface layer between the first and second stretching operations:

| Coating solution #2 | |
| --- | --- |
| Sulphopolyester dispersion (4) | 20 Parts above |
| Sulphopolyester dispersion (5) | 40 parts |
| Acetylenic surfactant (2) | 0.01 Parts |
| Deionized Water | 40 Parts |

Eastek 1200–10 sold by Lawter International

Eastek 1000 sold by Lawter International

Coating solution #2 was coated onto uniaxially oriented PET utilizing a #4 wire wound bar. This coating was dried and then the PET film drawn in the transverse direction to produce a composite PET film with a surface coating thickness of about 0.4 um. This coated PET film was then drawn in the transverse direction. Very good embossing was received under the test conditions.

Example 3

The base film as described was coated with the following surface layer between the first and second stretching operations:

| Coating solution #3 | |
| --- | --- |
| Styrene acrylic emulsion (1) | 50.0 Parts |
| Acetylenic Surfactant (2) | 0.01 parts |
| Deionized Water | 50.0 Parts |

Coating solution #3 was coated onto uniaxially oriented PET utilizing a #3 wire wound bar. This coating was dried and then the PET film drawn in the transverse direction to produce a composite PET film with a surface coating thickness of about 0.10 um. This coated PET film was then drawn in the transverse direction. Very good embossing was received under the test conditions.

Comparative Example 1

| Coating solution #4 | |
| --- | --- |
| Styrene-acrylic emulsion (1) | 6 Parts |
| Fluorosurfactant (6) | 0.01 Parts |
| Deionized Water | 94 Parts |

Zoynl FSO sold by Dupont

Coating solution #4 was coated onto uniaxially oriented PET utilizing a #4 wire wound bar. This coating was dried and then the PET film drawn in the transverse direction to produce a composite PET film with a surface coating thickness of about 0.10 um. This coated PET film was then drawn in the transverse direction. An embossed image was received under the test conditions. However, the image suffered from graininess.

Co-Extruded Co-Polyester Base Layer For Examples 4–5

An amorphous co-extruded surface layer for the polyester thermoplastic film was prepared as follows:

An isophtalic acid co-terephtahalic acid random co-polyester co-polymer with an IV of about 0.65 and a mol ratio of about 18% isophthalic acid 82% terephthalic, commercialy available from Dupont as Selar 8306, was co-extruded on a base sheet of polyethyleneterephthalate. The base sheet of polyethyleneterephthlate can be prepared as described above for the core layer. Alternatively, a co-polyester consisting of a random co-polymer of cyclohexane dimethanol residues, commercially available from Eastman Chemical, with an IV of about 0.70 can be utilized as the amorphous layer. The thickness of the amorphous layer was varied.

After the forward draw of the A/B co-extruded film the amorphous co-polyester surface was coated as described below. The coated film was then dried and transversely stretched to produce the final film structure.

Example 4

| Coating solution #1 | |
| --- | --- |
| Styrene acrylicc emulsion (1) | 49.0 Parts |
| Acetylenic Surfactant (2) | 0.01 parts |
| Propylene glycol phenyl ether (3) | 1.2 Parts |
| Deionized Water | 49.0 Parts |

Coating solution #1 was coated onto uniaxially oriented co-polyester PET utilizing a #4 wire wound bar. The surface layer of I-PET was approximately 0.6 um. This coating was dried and then the PET film drawn in the transverse direction to a stretching ratio of about 3.8 to produce a composite PET film with a surface coating thickness of about 0.4 um. Excellent embossing was received under the test conditions.

Example 5

The base layer as shown in Example 4 was coated with the following surface layer:

| Coating solution #2 | |
| --- | --- |
| Sulphopolyester dispersion (3) | 20 Parts above |
| Sulphopolyester dispersion (4) | 40 parts |
| Acetylenic surfactant (2) | 0.01 Parts |
| Deionized Water | 40 Parts |

Coating solution #2 was coated onto uniaxially oriented PET utilizing a #4 wire wound bar. This coating was dried and then the PET film drawn in the transverse direction to produce a composite PET film with a surface coating thickness of about 0.4 um. This coated PET film was then drawn in the transverse direction. Excellent embossing was received under the test conditions.

Reference Example 1

A commercially available sample of AET s A-Boss, embossable polypropylene was embossed under the test conditions. The sample showed good embossing characteristics with low graininess.

Comparative Example 2

The coextruded copolyester base layer as described in Examples 4 and 5 was prepared without a surface coating. The film was embossed under typical ebossing conditions illustrative for the other examples. The sample showed marginal embossing characteristics.

Comparative Example 3

A commercially available packaging grade of PET film was aquired from Toray Plastics Europe known as 10.41. This film is manufactured with an acrylic coating on one side with a reverse face of co-extruded CHDM copolyester. The copolyester surface was embossed under the consitions described here for the the other examples. The sample had marginal embossing characteristics.

| Sample | Base Film Surface | Coating | Image Brightness | Image Graininess | Gloss Reading |
|---|---|---|---|---|---|
| Example 1 | Low Roughness | #1 | Excellent | Excellent | 144 |
| Example 2 | Low Roughness | #2 | Excellent | Excellent | 142 |
| Example 3 | Low Roughness | #3 | Excellent | Excellent | 140 |
| Comparative Example 1 | High Roughness | #4 | Excellent | Marginal | 100 |
| Reference Example 1 | Low Roughness | — | Excellent | Excellent | 142 |
| Example 4 | Low Roughness | #1 | Excellent | Excellent | 137 |
| Example 5 | Low Roughness | #2 | Excellent | Excellent | 135 |
| Comparative Example 2 | Low Roughness | None | Marginal | Marginal | 132 |
| Comparative Example 3 | Low Roughness | None | Marginal | Marginal | 130 |

What is claimed is:

1. An embossable, coated polyethyleneterephthalate (PET) film comprising:

a uniaxially oriented PET base film; and a coating applied to the PET base film, wherein the coating and the PET base film have as a composite been transversely stretched, said coating resin impregnating a surface portion of the PET base film upon said transverse stretching, thereby rendering the surface portion of the film susceptible to embossing.

2. The film of claim 1, wherein the PET base film is co-extruded and forms at least two layers.

3. The film of claim 2, wherein the co-extruded layers comprise a polyester layer and a co-polyester layer.

4. The film of claim 3, wherein the co-polyester layer is formed from isophthalic acid or a derivative of cyclohexane dimethanol.

5. The film of claim 1, wherein the PET film has a thickness of about 4.5 µm to about 60 µm.

6. The film of claim 1, wherein the PET base film contains particles.

7. The film of claim 6, wherein particles are selected from the group consisting of silica, alumina, calcium carbonate and mixtures thereof.

8. The film of claim 6, wherein the particles are present in the amount of about 0.005 wt % to about 0.6 wt %, based on the weight of the PET film.

9. The film of claim 1, wherein the PET base film is stretched in an amount of about 3.4 to about 5.4 times.

10. The film of claim 1, wherein the coated PET film, as a composite, is stretched in an amount of about 3.3 to about 4.6 times in the transverse direction.

11. The film of claim 1, wherein the coating is formed from a material selected from the group consisting of a non-crosslinked polystyrene-acrylic emulsion and non-crosslinked polyester dispersion.

12. The film of claim 1, wherein the coating has a thickness of about 0.1 µm to about 0.4 µm.

13. The film of claim 1, wherein the co-polyester layer has a thickness between about 0.1 µm and 3.0 µm.

14. The film of claim 1, wherein the co-polyester layer has an upper surface contacting the coating and has a roughness Ra< about 40 nm.

* * * * *